United States Patent [19]

Alper et al.

[11] 4,006,212

[45] Feb. 1, 1977

[54] PROCESS FOR RECOVERY OF MOLYBDENUM AND RHENIUM FROM ORES

[75] Inventors: Allen Myron Alper, Towanda; Carl William Boyer, Wysox; Brice Eugene Martin, Towanda, all of Pa.

[73] Assignee: GTE Sylvania Incorporated, Stamford, Conn.

[22] Filed: Sept. 10, 1975

[21] Appl. No.: 612,097

[52] U.S. Cl. .................. 423/49; 423/54; 423/53; 423/61; 423/208

[51] Int. Cl.$^2$ .................. C01G 39/00; C01G 47/00

[58] Field of Search ............. 423/53, 49, 61, 208

[56] References Cited

UNITED STATES PATENTS

| | | | |
|---|---|---|---|
| 2,187,750 | 1/1940 | Marvin | 423/53 |
| 2,381,565 | 8/1945 | Udy | 423/58 |
| 3,622,301 | 11/1971 | Mehl et al. | 423/53 |
| 3,725,524 | 4/1973 | Martin et al. | 423/49 |
| 3,770,869 | 11/1973 | Kim et al. | 423/54 |

*Primary Examiner*—Herbert T. Carter
*Attorney, Agent, or Firm*—Norman J. O'Malley; John C. Fox; Donald R. Castle

[57] ABSTRACT

In the recovery of molybdenum and rhenium values from sulfide ores, silica impurity is reduced to low levels by adding alumina to a carbonate fusion mix in an amount sufficient to combine with the silica present to form insoluble aluminum silicates, thus preventing its removal from the fusion mass during removal of soluble molybdenum and rhenium values by leaching, and thereby avoiding the necessity for conventional subsequent precipitation and filtration removal steps.

5 Claims, No Drawings

PROCESS FOR RECOVERY OF MOLYBDENUM AND RHENIUM FROM ORES

CROSS REFERENCE TO RELATED APPLICATIONS

In co-pending U.S. patent application Ser. No. 556,720 filed Mar. 10, 1975, assigned to the same assignee as the present invention, is disclosed a process for the recovery of solutions of alkali molybdates and perrhenates from sulfur bearing ores using carbonate fusion.

In co-pending U.S. patent application Ser. No. 255,232 filed May 19, 1972, and assigned to the same assignee as the present invention, is disclosed a process for the recovery of molybdenum from alkali molybdate aqueous solutions by solvent extraction techniques.

BACKGROUND OF THE INVENTION

This invention relates to the recovery of molybdenum and rhenium values from molybdenite ores, and more particularly relates to a process for the production of alkali molybdate and perrhenate-containing solutions having low levels of silica.

Alkali metal carbonate fusion of molybdenite ($MoS_2$) ores or concentrates such as is described in U.S. Pat. Nos. 3,725,524 and 3,770,869, both assigned to the same assignee as the present application, results in conversion of molybdenum, rhenium and sulfur values to water soluble alkali molybdates, perrhenates and sulfates. In addition, any silica present as an impurity in the ore is converted by excess carbonate to soluble alkali silicate, for example sodium silicate. These soluble products are then removed from the solidified fusion mass by water leaching. The resulting solution is then conventionally adjusted to a pH of about 8.5 to 9 with sulfuric acid to precipitate insoluble silica and is then filtered to remove the precipitate. Typically, 150 mg/l of silica remains in solution after filtration, which is sufficient to cause physical handling problems in subsequent solvent extraction processes to recover molybdenum from the alkali molybdate containing leach solution. In addition, this amount of silica will remain with the molybdenum throughout the solvent extraction process and result in molybdenum products which are unsuitable for certain chemical and metallurgical applications.

SUMMARY OF THE INVENTION

In accordance with the invention it has been discovered that fusion of molybdenite ($MoS_2$) ores or concentrates with an alkali metal carbonate and sufficient aluminum oxide to combine with contained silica to form insoluble compounds of alumina and silica, followed by leaching the solidified fusion mass to remove the soluble alkali molybdate, perrhenate and sulfate, results in low levels of silica (for example typically less than 25 mg/1) in the leach solution. Such low levels are sufficient in a solvent extraction feed solution to avoid physical handling problems, and also to make the final molybdenum product suitable for most chemical and metallurgical applications.

As used herein the term "contained silica" is meant to refer to silica and other oxides of silicon as well as other compounds containing silicon which are capable of combining with alumina to form water insoluble compounds.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

Carbonate fusion of molybdenite ores is well understood by those skilled in the art and is typified by the teachings of U.S. Pat. Nos. 3,770,869 and 3,725,524, both assigned to the assignee of the present application. As therein set forth, oxidation may be carried out at various stages of processing to convert insoluble molybdenum, rhenium and sulfur values to soluble form and/or to remove sulfide ion prior to solvent extraction processes. In addition, U.S. Pat. No. 3,725,524 teaches fusion in the absence of air to prevent $SO_2$ evolution and loss of molybdenum and rhenium values as volatile $MoO_3$ and $Re_2O_7$. While the invention is primarily described in terms of such optimum teachings, it is to be understood that successful removal of silica is not dependent upon carrying out fusion in a nonoxidizing atmosphere nor upon subsequent oxidation to increase yields of soluble molybdenum and rhenium values.

The alkali metal carbonate fusion step in a non-oxidizing atmosphere achieves conversion of from about 90 to 95 percent of the molybdenum sulfide present in the ore to alkali metal molybdate. Subsequent oxidation converts remaining molybdenum, rhenium and sulfur values to water soluble form. After oxidation and leaching with water under preferred conditions as disclosed herein, the resulting water solution contains dissolved therein greater than 98 percent of the rhenium, molybdenum and sulfur originally in the ore.

In the carbonate fusion step, a controlled excess of an alkali metal carbonate of that theoretically required to convert the molybdenum, rhenium and sulfur to water soluble form is added to insure the conversion. In theory, one mole of alkali metal carbonate is required for each mole of molybdenum, one mole for sulfur and one half mole for rhenium. In a preferred process a molar excess of at least about 15 percent of that required for the theoretical conversion of the molybdenum, rhenium and sulfur as well as carrying out fusion in a nonoxidizing atmosphere is necessary to prevent the evolution of $SO_2$ and sublimation of rhenium and molybdenum values during the fusion. In most available sulfide ores produced as a byproduct of copper ore upgrading the amount of carbonate will be about equal to 3.5 moles of carbonate per mole of molybdenum present in the ore calculated as molybdenum disulfide. Any of the alkali metal carbonates such as sodium carbonate, potassium carbonate, lithium carbonate and the like can be used. However, sodium and potassium carbonates are preferred with sodium carbonate being especiallly preferred.

Silica is present as an impurity in most ores. The presence of excess carbonate will normally result in conversion during fusion of such silica impurities to water soluble form. In accordance with the invention, sufficient alumina is added to the fusion mix to combine with the contained silica to form insoluble compounds, typically silicates such as aluminum silicate. Preferably, $Al_2O_3$ in excess of the stoichiometric amount required is avoided, since such excess tends to increase the temperature required for fusion. However, $Al_2O_3$ in amounts up to 50% in excess of the stoichiometric amount may be added.

The fusion temperatures are from about 700° to 950° C. At temperatures below about 700° C the fusion mass may solidify and since some of the materials may be evolved about 950° C, this temperature constitutes a practical upper limit.

After the ore and the alkali metal carbonates and the alumina are blended together and heated to the desired fusion temperature, the temperature is maintained until the evolution of gases, primarily carbon dioxide, ceases.

After the evolution of gases ceases, the molten fusion mass may be oxidized to form additional amounts of soluble compounds of molybdenum and rhenium. Lack of oxidation results in essentially all of the rhenium values and a portion of the molybdenum values, normally about 5 percent remaining water insoluble.

Such oxidation may be carried out on the still molten fusion mass in order to recover maximum amounts of molybdenum and rhenium values, as disclosed in copending patent application Ser. No. 556,720, or oxidation may be carried out on the solidified fusion mass subsequent to at least a first leaching step, as disclosed in U.S. Pat. No. 3,725,524, where recovery of alkali molybdate leach solution uncontaminated by rhenium values is desired.

The amount of water used to leach can be varied. Sufficient water is added so that a sample of leach insolubles do not indicate any transparent material when viewed with a polarized microscope. Generally about 10 to 20 parts of water per part of fusion mass on a weight basis is sufficient. Generally a two step leaching or washing procedure is preferred with from about ⅔ to about ¾ of the total water being initially added and the remainder added later. The two washes are then combined and concentrated to about ⅓ of the original volume before subsequent separation and recovery.

Any of the various means known in the art, such as solvent extraction using alcohols, ketones and esters, various amines and tetraphenyl phosphonium and arsonium chloride, can be used to extract rhenium from molybdenum such as the processes disclosed in U.S. Pat. Nos. 3,798,305 and 3,856,915 both assigned to the assignee of this application. Molybdenum can thereafter be extracted from the sulfate or the sulfate can be extracted from molybdenum by techniques known in the art.

To more fully illustrate the subject invention the following detailed examples are presented. All parts, proportions and percentages are by weight unless otherwise indicated.

EXAMPLE I 1320 pounds of a molybdenite ore containing approximately 1.8 percent silicon as silica was fused with 2456 pounds of sodium carbonate, at 800° C, oxidized by bubbling air through the melt at about 850° C, poured from the furnace, solidified, pulverized, leached with 860 gallons water and filtered. A 770 gallon batch of the solution was then adjusted to pH of about 8.5 to 9 with sulfuric acid to precipitate the silica and the solution was then filtered to remove the precipitate. The resultant solution contained 150 milligrams per liter of silicon as a soluble sodium silicate. This example represents the conventional technique for removal of silica impurities from molybdenite ore.

EXAMPLE II 1400 pounds of a molybdenite ore which contained approximately 5.7 percent silicon as silica was fused at 800° C, with 2242 pounds of sodium carbonate, and (220 pounds) of alumina to combine with the silica in the ore to form alumina silicate. This amount corresponds to a mole ratio of .76 alumina to 1.0 silica. The fused melt was oxidized by bubbling air through the melt at 850° C, poured from the furnace, solidified, pulverized, leached with 1035 gallons of water and filtered. An 840 gallon batch of the solution was then adjusted to pH of 8.5 to 9 with sulfuric acid and filtered. The resultant solution contained 8 milligrams per liter of silicon as sodium silicate, indicating a substantial improvement in removal of silica from a carbonate leach solution by the addition of alumina to the fusion mass.

EXAMPLE III 25 grams of a molybdenite ore concentrate was fused with 46.8 grams of flux containing 92.5 weight percent sodium carbonate, and oxidized by heating in air at about 850° C for about 45 minutes, poured from the furnace, solidified, pulverized, and leached with 500 mililiters of water at 90° C for 1 hour, followed by releaching with 200 mililiters of water at 90° C for 1 hour. The leach solutions were then combined and evaporated to a volume of 0.215 liters. The sludge was filtered from the leach solution and was found to contain less than 4.6 weight percent of the original rhenium in the ore concentrate and less than 0.05 weight percent of the original molybdenum in the ore concentrate. The leach solution was found to contain 420 miligrams per liter of silicon.

EXAMPLE IV

The procedure of Example III was repeated except that 1.785 grams of alumina were added to the fusion mix. The sludge was found to contain less than 7 percent of the original rhenium and less than 0.07 percent of the original molybdenum. The leach solution contained 25 miligrams per liter of silicon. Thus, by the addition of alumina to the fusion mix the amount of silicon contained in the leach solution was reduced from 420 miligrams per liter to 25 miligrams per liter. In addition the amounts of molybdenum and rhenium remaining in the sludge indicate that the use of alumina is not detrimental to the extraction of these values from the original molybdenite ore concentrate.

While there has been shown and described what are at present considered the preferred embodiments of the invention, it will be obvious to those skilled in the art that various changes and modifications may be made therein without departing from the scope of the invention as defined by the appended claims.

What is claimed is:

1. Process for recovery of molybdenum and rhenium values from sulfide ores containing said values, and impurities including contained silica, the process comprising fusing said ores with a molar excess of alkali metal carbonate of at least 15% over that required for the theoretical conversion of the molybdenum, rhenium and sulfur values to water soluble form, said fusing carried out in a nonoxidizing atmosphere at a temperature of from about 700°–950° C, until the resulting carbon dioxide evolution ceases, solidifying and leaching the fusion mass with water to separate the water soluble values from said impurities, characterized in that there is added to the fusion mass at least an amount of alumina needed to combine with contained silica to convert the contained silica to an insoluble form during fusion, whereby said insolubles are separated from the soluble alkali metal values during water leaching.

2. Process of claim 1 wherein the fusion mass is oxidized following cessation of carbon dioxide evolution to convert a substantial amount of any remaining insoluble molybdenum, rhenium and sulfur values to water soluble form.

3. Process of claim 2 wherein the oxidation is carried out prior to solidification of the fusion mass.

4. Process of claim 2 wherein oxidation is carried out following solidification and leaching of the fusion mass, and such oxidation is followed by further leaching of the oxidized solidified fusion mass.

5. Process of Claim 1 wherein the alumina is added in an amount up to 50 percent in excess of the stoichiometric amount required to convert the contained silica to insoluble form.

* * * * *